(12) United States Patent
Kiyoshita et al.

(10) Patent No.: US 11,312,210 B2
(45) Date of Patent: Apr. 26, 2022

(54) VEHICLE BODY UPPER STRUCTURE

(71) Applicant: Mazda Motor Corporation, Hiroshima (JP)

(72) Inventors: Daisuke Kiyoshita, Hiroshima (JP); Takeshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 167 days.

(21) Appl. No.: 16/808,378

(22) Filed: Mar. 4, 2020

(65) Prior Publication Data

US 2020/0290434 A1    Sep. 17, 2020

(30) Foreign Application Priority Data

Mar. 14, 2019    (JP) .............................. JP2019-047327

(51) Int. Cl.

| B60J 1/00 | (2006.01) |
|---|---|
| B60J 1/02 | (2006.01) |
| B62D 25/08 | (2006.01) |
| B62D 25/06 | (2006.01) |
| B62D 25/04 | (2006.01) |

(52) U.S. Cl.
CPC .................. B60J 1/006 (2013.01); B60J 1/02 (2013.01); B62D 25/04 (2013.01); B62D 25/06 (2013.01); B62D 25/08 (2013.01)

(58) Field of Classification Search
CPC .. B60J 1/006; B60J 1/02; B62D 25/06; B62D 25/04; B62D 25/08
USPC .................................................... 296/96.21
See application file for complete search history.

(56) References Cited

U.S. PATENT DOCUMENTS 9,180,917 B1 *  11/2015  Wu ...................... B62D 27/023
9,592,856 B2 *   3/2017  Nakamura ............. B62D 25/06

FOREIGN PATENT DOCUMENTS

| JP | H06-1262 A | 1/1994 |
|---|---|---|
| JP | 2005-231496 A | 9/2005 |
| JP | 2010-083248 A | 4/2010 |
| JP | 2010-125980 A | 6/2010 |
| JP | 2011-093449 A | 5/2011 |
| JP | 2011093449 A * | 5/2011 |

OTHER PUBLICATIONS

Office Action dated Oct. 19, 2021, in corresponding Japanese patent Application No. 2019-047327, 6 pages.

* cited by examiner

*Primary Examiner* — D Glenn Dayoan
*Assistant Examiner* — Dana D Ivey
(74) *Attorney, Agent, or Firm* — Xsensus LLP (57) ABSTRACT

A vehicle body upper structure includes a pair of first structures that constitute portions on both sides in a width direction of a vehicle body in an upper portion of the vehicle body; and a second structure that extends in the width direction and is joined at opposing ends to the first structures so as to define at least a part of a window opening, to which a windshield is attachable in cooperation with the first structures. The second structure includes a low-rigid portion that is joined to one of the pair of first structures in a first area of the one of the pair of first structures, and a high-rigid portion that is separated in distance in the width direction from the first area and that has higher rigidity than the low-rigid portion. The low-rigid portion being joined to one of the first structures via the damping material.

19 Claims, 9 Drawing Sheets

VEHICLE BODY UPPER STRUCTURE

CROSS REFERENCE TO RELATED APPLICATION

The present application contains claims priority to Japanese Priority Application 2019-047327, filed Mar. 14, 2019, the entire contents of which are incorporated herein by reference.

TECHNICAL FIELD

The present disclosure relates to a vehicle body upper structure.

BACKGROUND ART

In a normal vehicle, a windshield is joined to an opening that is formed in an upper front portion or an upper rear portion of a vehicle body by adhesion or the like. In such a vehicle body upper structure, a vibration generated in a wheel or a powertrain is transmitted to the windshield via a vehicle body frame during travel of the vehicle. As a result, the windshield vibrates, and the vibration thereof is possibly transmitted as noise to the inside of a cabin.

In order to suppress transmission of the vibration to the windshield, in a vehicle body structure disclosed in Patent document 1, an adhesive having a vibration damping property is used to adhere the windshield to the vehicle body frame.

In a vehicle body structure disclosed in Patent document 2, a rear header member that defines a windshield opening in the vehicle body frame and a rear-pillar side block are adhered to each other by the adhesive having the vibration damping property, so as to suppress the transmission of the vibration to the windshield.

PRIOR ART DOCUMENTS

Patent Documents

[Patent document 1] JP-A-2010-125980
[Patent document 2] JP-A-2011-93449

SUMMARY OF THE DISCLOSURE

Problems to be Solved Disclosure

In both of the above vehicle body upper structures, the transmission of the vibration to the windshield is suppressed by using the adhesive having the vibration damping property. By the way, in order to improve steering stability of the vehicle, it is preferred to improve rigidity of the vehicle body. In the vehicle body upper structure, it is an aim to improve the rigidity of a roof side rail, a front pillar, a front header, and the like. However, in the case where rigidity of components, such as the front pillar and the front header, for defining the opening, to which the windshield is joined, is improved, the components themselves are likely to function as vibration transmission paths. As a result, improvement in suppression of vibration transmission to the windshield by the adhesive becomes difficult.

The present disclosure has been made in view of the above circumstance and therefore has a purpose of providing a vehicle body upper structure capable of improving an effect of suppressing transmission of a vibration to a windshield while securing rigidity of a vehicle body.

Means for Solving the Problems

In order to solve the above, and other, problems, A vehicle body upper structure includes a pair of first structures that constitute portions on both sides in a width direction of a vehicle body in an upper portion of the vehicle body; and a second structure that extends in the width direction and is joined at opposing ends to the first structures so as to define at least a part of a window opening, to which a windshield is attachable in cooperation with the first structures. The second structure includes a low-rigid portion that is joined to one of the pair of first structures in a first area of the one of the pair of first structures, and a high-rigid portion that is separated in distance in the width direction from the first area and that has higher rigidity than the low-rigid portion. The low-rigid portion being joined to one of the first structures via the damping material.

In such a configuration, the second structure that defines at least the part of the window opening in cooperation with the first structures includes the low-rigid portions joined to the first structures. Thus, a vibration that is transmitted from the first structure to the second structure is concentrated in the low-rigid portion. Since a portion near the low-rigid portion is joined to the first structure via the damping member, the vibration concentrated in the low-rigid portion is effectively damped by the damping member. Meanwhile, in the second structure, the high-rigid portion is arranged at the position away from the portion where the low-rigid portion is joined to the first structure. Thus, it is possible to secure rigidity of the second structure. As a result, it is possible to improve an effect of suppressing transmission of the vibration to the windshield by the damping member while securing rigidity of the vehicle body.

In the vehicle body upper structure described above, the second structure preferably has plural ridgeline portions, each of which extends in a longitudinal direction of the second structure. The low-rigid portion preferably has a portion formed such that a distance between the plural ridgeline portions becomes a specified first distance. The high-rigid portion has a portion formed such that a corresponding distance between plural ridgeline portions in the high-ridge portion is a second distance that is shorter than the specified first distance.

In such a configuration, it is possible to easily form the low-rigid portion and the high-rigid portion in the second structure only by changing the distance between the ridgeline portions. In addition, the second structure can easily be designed such that the low-rigid portion and the high-rigid portion each have the desired rigidity.

In the vehicle body upper structure described above, the ridgeline portions preferably continue such that as respective locations along the low-ridge portion become progressively more distant from the one of the pair of first structures, a length of the specified first distance gradually approaches a length of the second distance.

In such a configuration, it is possible to suppress a rapid change in the rigidity of the second structure.

In the vehicle body upper structure described above, the second structure preferably includes a lower member and an upper member. The ridgeline portions are preferably formed in the lower member or the upper member, and the lower member and the upper member are preferably joined to each other in a portion having the second distance.

In such a configuration, the lower member and the upper member that constitute the second structure are joined to each other in a portion having the second distance. Thus, it is possible to further increase the rigidity of the high-rigid portion in the second structure.

In the vehicle body upper structure described above, the ridgeline portions are preferably constructed of projections, each of which extends in the longitudinal direction of the second structure.

According to such a configuration, each of the ridgeline portions can be constructed by forming the projection that extends in the longitudinal direction of the second structure in the second structure. Thus, the ridgeline portions can easily be designed and processed.

In the vehicle body upper structure described above, the second structure preferably includes a plate-shaped structure that extends to connect the pair of first structures, and each of the projections preferably includes a portion of the plate-shaped structure that is deformed in a plate-thickness direction of the plate-shaped structure.

In such a configuration, it is possible to easily form the projection by processing the plate-shaped structure by pressing or the like.

In the vehicle body upper structure described above, the high-rigid portion preferably includes a bulged portion that is formed as a downward formation in the plate-shaped structure.

According to such a configuration, it is possible to improve the rigidity while suppressing the upward projection of the high-rigid portion and the second structure including the high-rigid portion.

In the vehicle body upper structure described above, the low-rigid portion preferably has a closed cross section that has the longitudinal direction of the second structure as a normal direction, and the high-rigid portion preferably has plural closed cross sections, each of which has the longitudinal direction as a normal direction.

In such a configuration, the low-rigid portion and the high-rigid portion can be constructed by changing the number of the closed cross sections. Thus, it is unnecessary to significantly change outer dimensions of each of the closed cross sections in the low-rigid portion and the high-rigid portion. As a result, it is possible to reduce an influence on shapes and arrangement of components (a roof panel and the like) of the vehicle body that are arranged around the second structure.

In the vehicle body upper structure described above, the low-rigid portion has an opening that is formed in a part of a portion constituting the closed cross section.

In such a configuration, when the opening is formed in the part of the closed cross section in the low-rigid portion, it is possible to further reduce the rigidity of the low-rigid portion. In this way, the vibration can further be concentrated on the low-rigid portion, and it is possible to further improve the effect of suppressing the transmission of the vibration to the windshield by the damping member.

Advantage of the Disclosure

According to the vehicle body upper structure of the present disclosure, it is possible to improve the effect of suppressing the transmission of the vibration to the windshield by the damping member while securing the rigidity of the vehicle body.

MODES FOR CARRYING OUT THE DISCLOSURE

A description will hereinafter be made on embodiments of the present disclosure with reference to the accompanying drawings.

As an exemplary embodiment of the present disclosure, an upper structure of a vehicle body 1 illustrated in FIGS. 1 to 4 relates to a structure that defines a window opening 4, to which a front-side windshield 5 can be attached, and includes: a pair of front pillars 2 as a pair of first structures; a front header 3 as a second structure; damping glues 21, 23, each of which joins the front header 3 to the front pillar 2; and a damping glue 22 that joins components (a lower side member 7 and a lower center member 8), which will be described later, in the front header 3.

The damping glues 21, 22, 23 are included as damping members in the present disclosure and have a primary function of damping a vibration by converting vibration energy into thermal energy. A material and a physical property of each of the damping glues are not particularly limited in the present disclosure. As each of the damping glues 21, 22, 23, for example, a sealer or a rubber-based adhesive that is frequently used in a hemmed portion between an outer panel and an inner panel of a vehicle body is used. Such an adhesive or the like has a vibration damping characteristic when a storage modulus is equal to or lower than 500 MPa and a loss coefficient is equal to or higher than 0.2 under conditions that a temperature is 20° C. and a frequency of an excitation force is 30 Hz.

Figure 3:
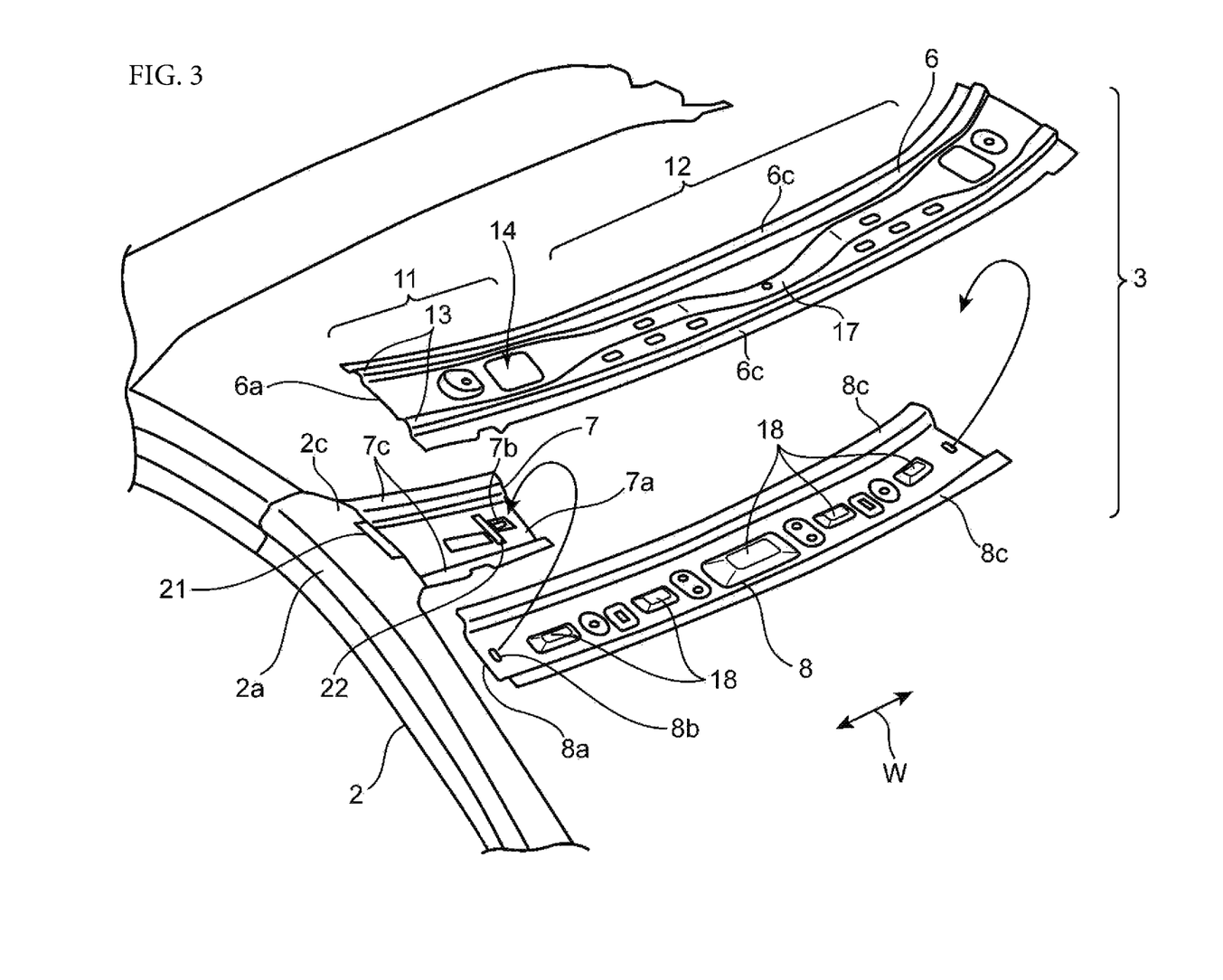
FIG. 3 is a perspective view for illustrating a state where the front header illustrated in FIG. 2 is exploded.
Figure 4:
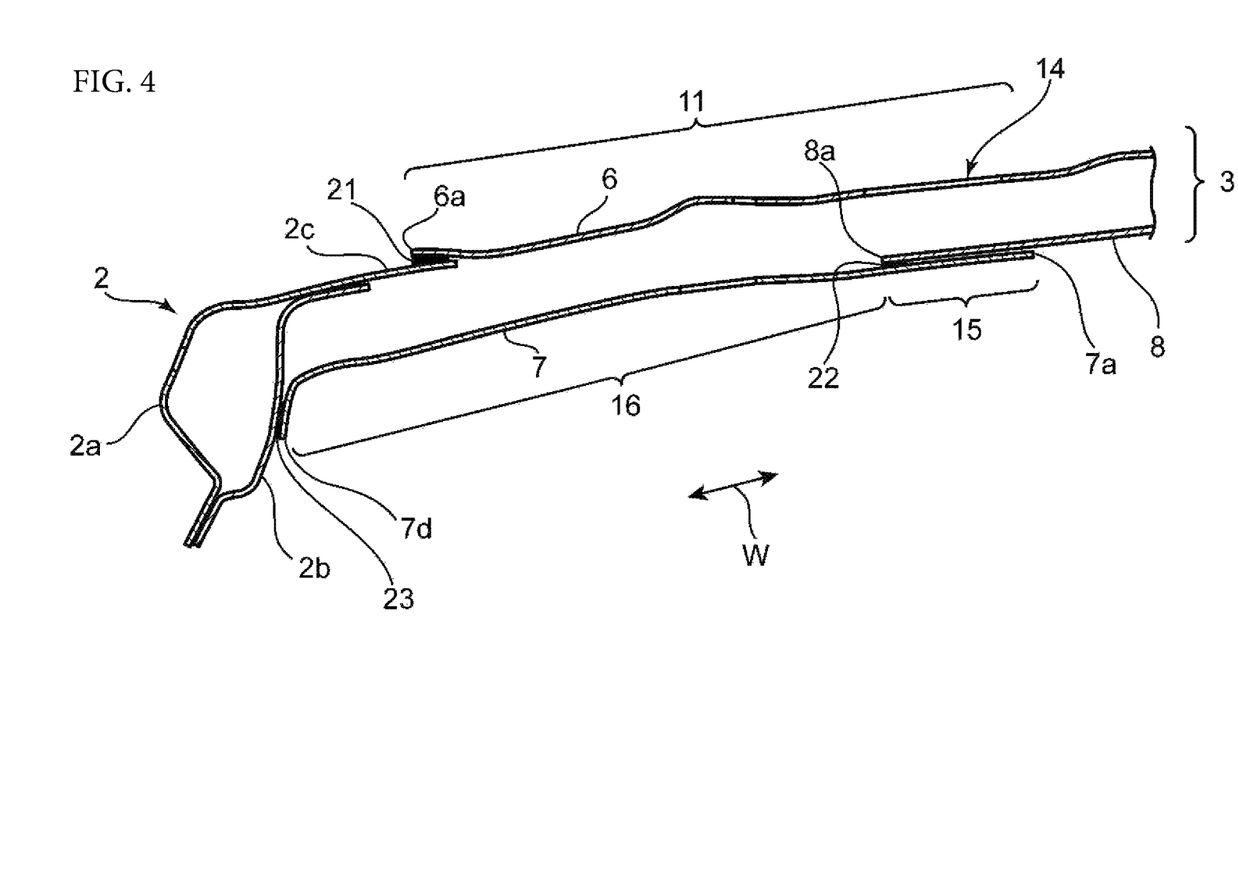
FIG. 4 is a cross-sectional view that is taken along line IV-IV in FIG. 2.

The front pillars 2 are the structures that constitute portions on both sides of the vehicle body 1 in a width direction W in an upper portion of the vehicle body 1. Each of the front pillars 2 is a long member that extends in an upward direction to the rear of the vehicle body 1. As illustrated in FIGS. 3 to 4, each of the front pillars 2 includes: an outer member 2a that faces an outer side of the vehicle body 1; an inner member 2b that faces an inner side of the vehicle body 1; and a projected portion 2c that is projected inward in the width direction W of the vehicle body 1 from an upper end of the outer member 2a.

Figure 1:
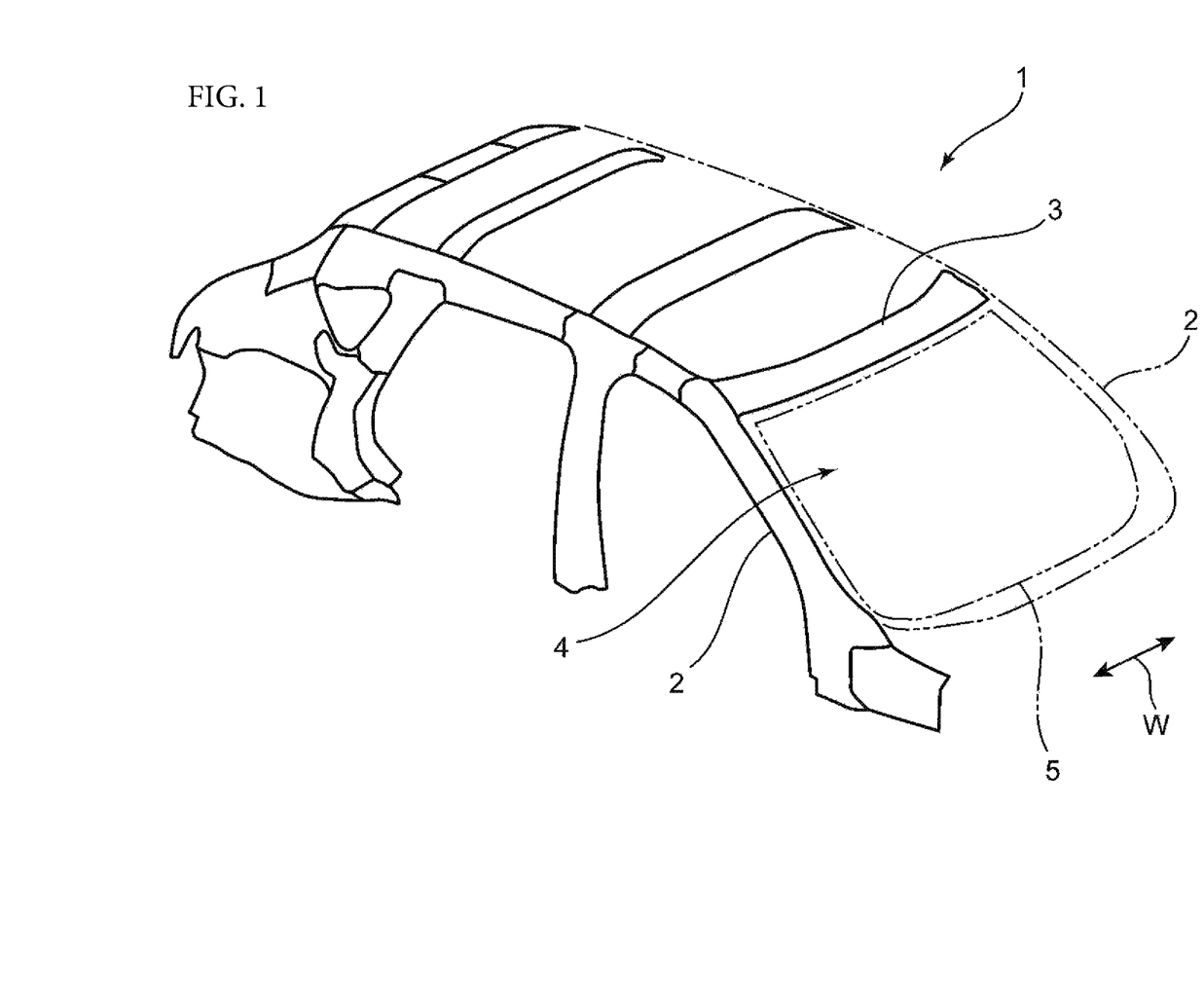
FIG. 1 is an entire perspective view of a vehicle body upper structure according to an embodiment of the present disclosure.
Figure 2:
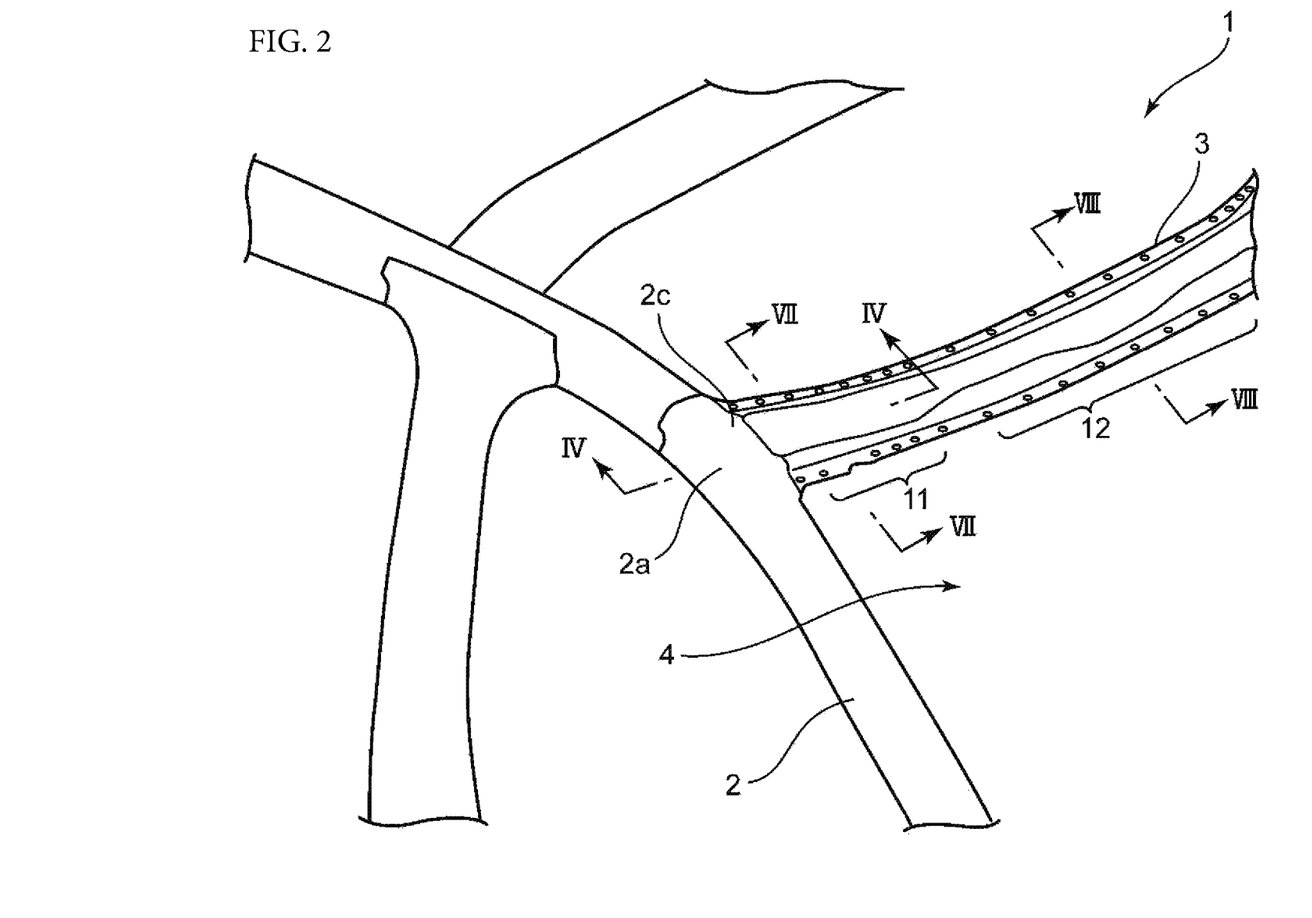
FIG. 2 is an enlarged perspective view in which a joined portion between a front pillar and a front header illustrated in FIG. 1 and a portion around the joined portion are enlarged.

As illustrated in FIGS. 1 to 2, the front header 3 is a structure that is arranged on an upper front side of the vehicle body 1, extends in the width direction W of the vehicle body 1, and is joined to the front pillars 2 so as to define at least a part of the window opening 4, to which the front-side windshield 5 can be attached, in cooperation with the front pillars 2. The windshield 5 is joined to a portion projected inward of the window opening 4 that is formed by the front pillar 2 and the front header 3, for example, a flange 6c (see FIG. 3) of an upper member 6, which will be described later, and the like by the adhesive (not illustrated) such as the damping glue.

As illustrated in FIGS. 3 to 6, the front header 3 is constructed of: the upper member 6 that constitutes an upper surface of the front header 3; a pair of the lower side members 7 (see FIG. 10) as a pair of first components that constitutes portions on both sides of a lower surface of the front header 3; and the lower center member 8 as a second component that constitutes a lower central portion of the front header 3. In this embodiment, the lower side members 7 and the lower center member 8 will collectively be referred to as "lower members" of the front header 3.

As illustrated in FIGS. 2 to 5 and FIG. 9, the upper member 6 is formed of a plate-shaped structure such as a thin metal plate, and is a long member that extends to connect the front pillars 2.

Each of the lower side members 7 and the lower center member 8 is also formed of the plate-shaped structure such as the thin metal plate.

In the upper structure of the vehicle body 1 in this embodiment, the upper member 6 and the front header 3 including the upper member 6 include: a low-rigid portion 11 in which a portion at an end 6a of the upper member 6 is joined to the projected portion 2c of the front pillars 2; and a high-rigid portion 12 that is arranged at a position away from the portion (the end 6a) where the low-rigid portion 11 is joined to the front pillar 2 and is more rigid than the low-rigid portion 11.

The upper member 6 has plural (two in this embodiment) ridgeline portions 13, each of which extends in a longitudinal direction of the front header 3 (that is, the same direction as the width direction W). Each of the ridgeline portions 13 is constructed of a projection that extends in the longitudinal direction of the front header 3. Note that the three or more ridgeline portions 13 may be provided. The ridgeline portions 13 may be formed in the lower members (the lower side members 7 and the lower center member 8) instead of the upper member 6.

Figure 7:
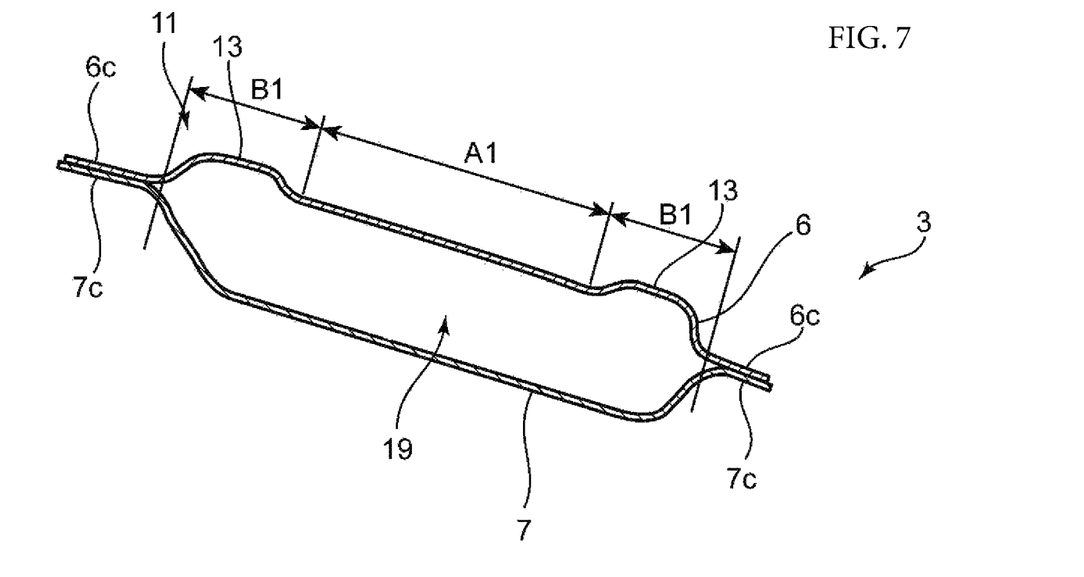
FIG. 7 is a cross-sectional view that is taken along line VII-VII in FIG. 2.
Figure 8:
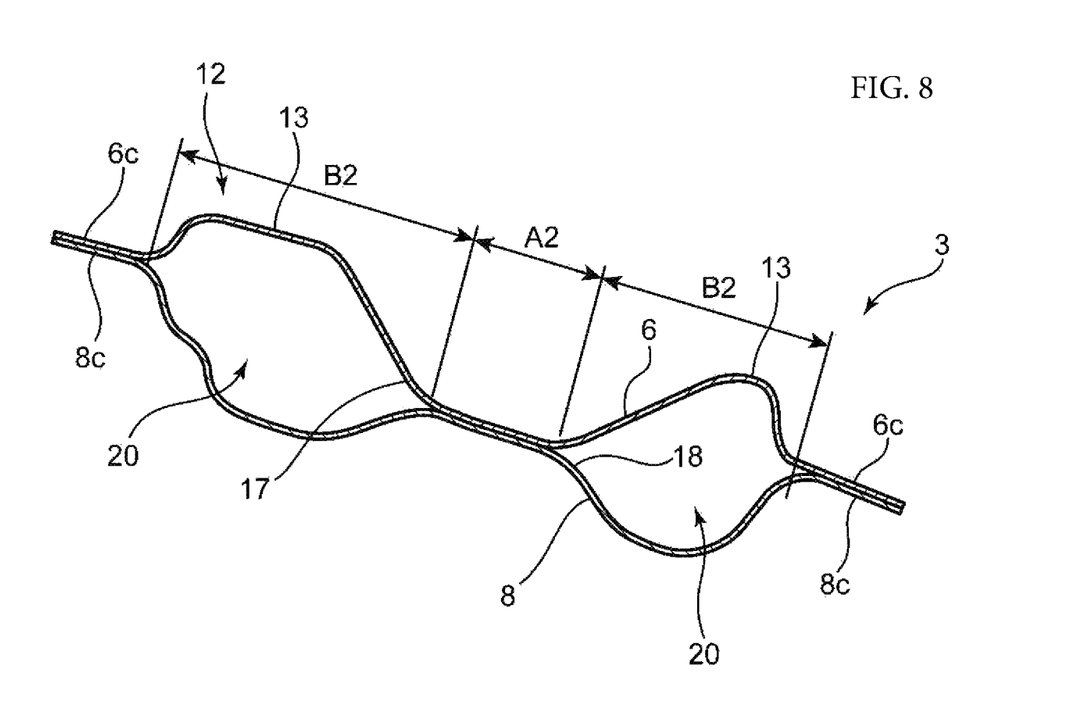
FIG. 8 is a cross-sectional view that is taken along line VIII-VIII in FIG. 2.
Figure 9:
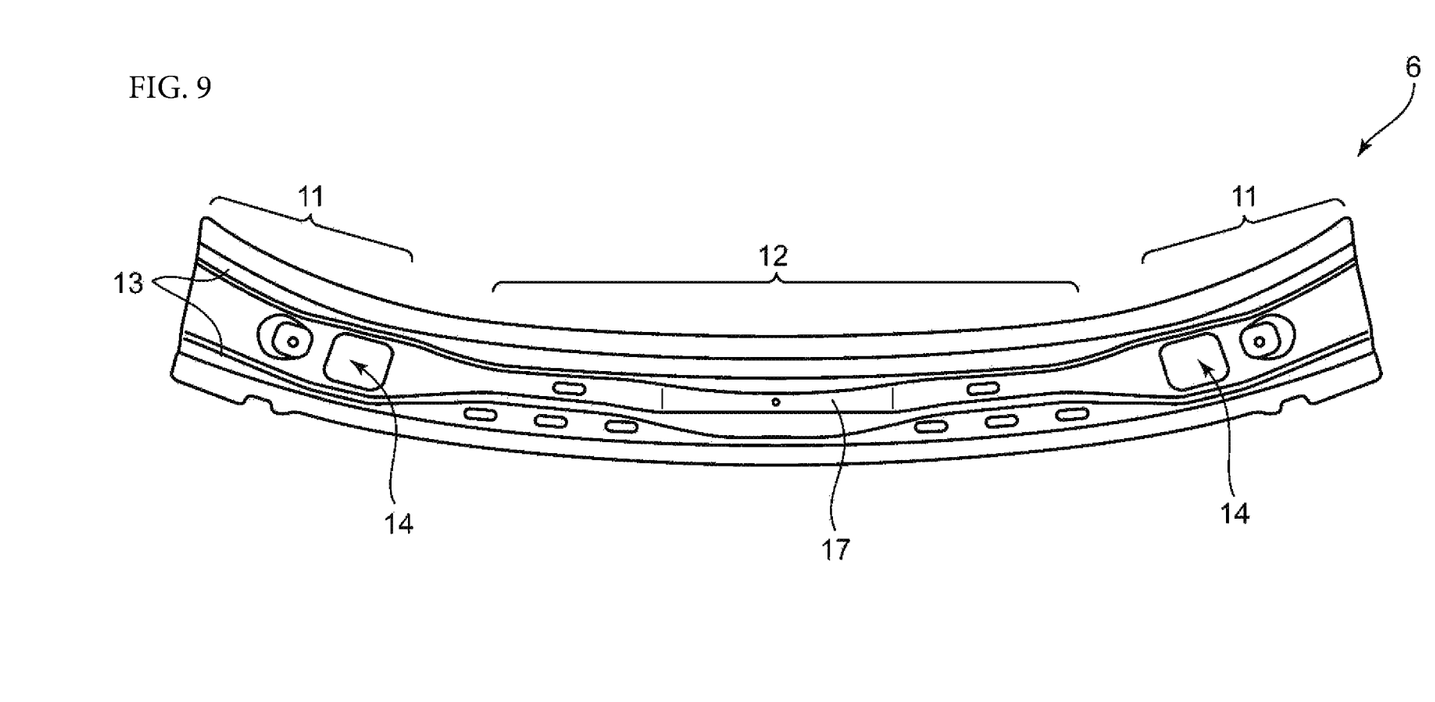
FIG. 9 is a plan view of an upper member in FIG. 3.

As illustrated in FIG. 3 and FIGS. 7 to 8, each of the projections constituting the ridgeline portions 13 is constructed of a portion of the upper member 6 that is deformed to bend the upper member 6 upward in a plate thickness direction. Accordingly, each of the ridgeline portions 13 has a projected shape that extends in a longitudinal direction of the upper member 6.

Figure 5:
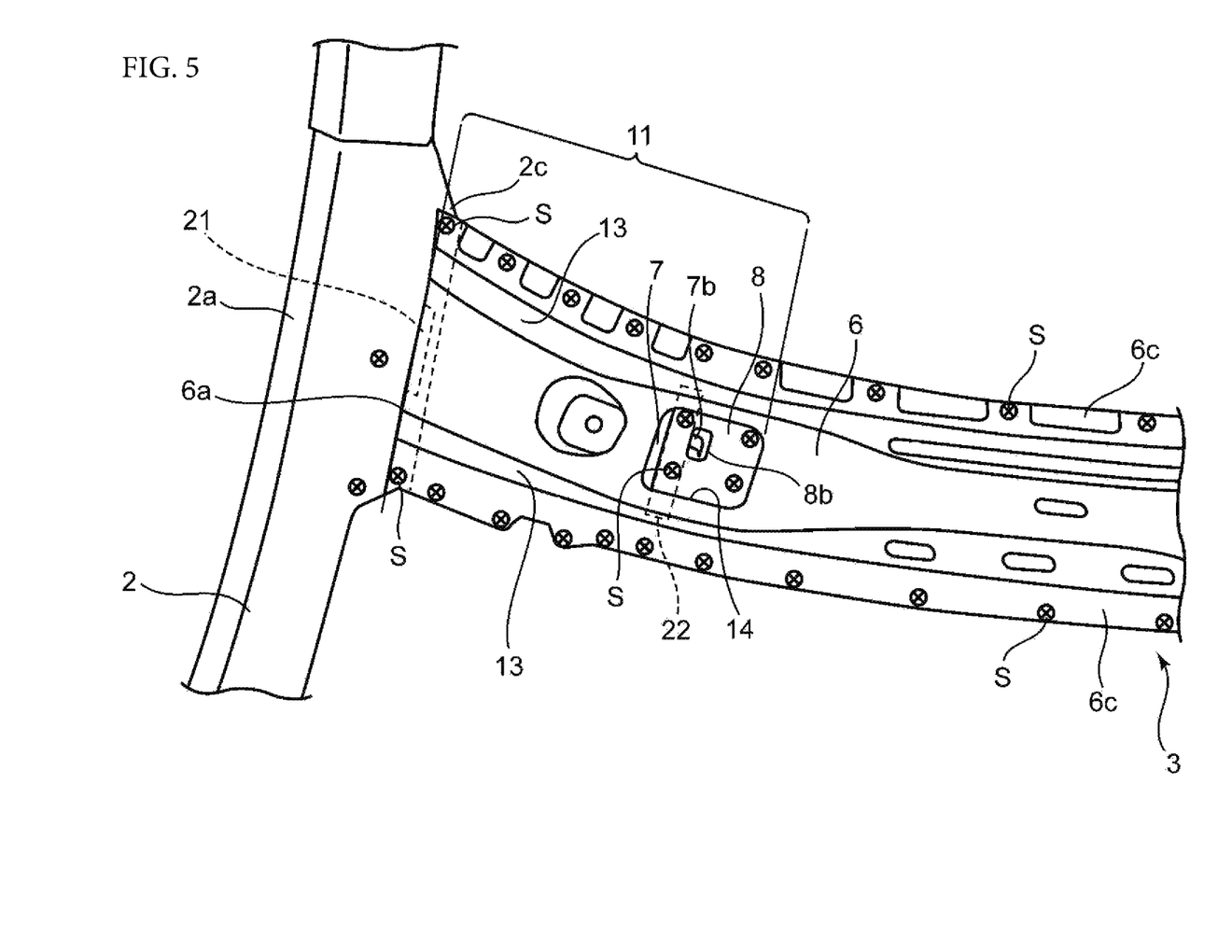
FIG. 5 is a perspective view for illustrating arrangement of adhesives when the front header illustrated in FIG. 2 is seen from above.

As illustrated in FIGS. 3 to 5, the end 6a of the upper member 6 in the low-rigid portion 11 is joined to the projected portion 2c, which is projected inward in the width direction W of the vehicle body 1, in the front pillar 2 via the damping glue 21. The end 6a of the upper member 6 is further welded at welding points S to the projected portion 2c by spot welding.

In the upper member 6, as illustrated in FIG. 2 and FIG. 7, the low-rigid portion 11 of the front header 3 has a portion formed such that a distance between the plural ridgeline portions 13 becomes a specified first distance A1.

Figure 6:
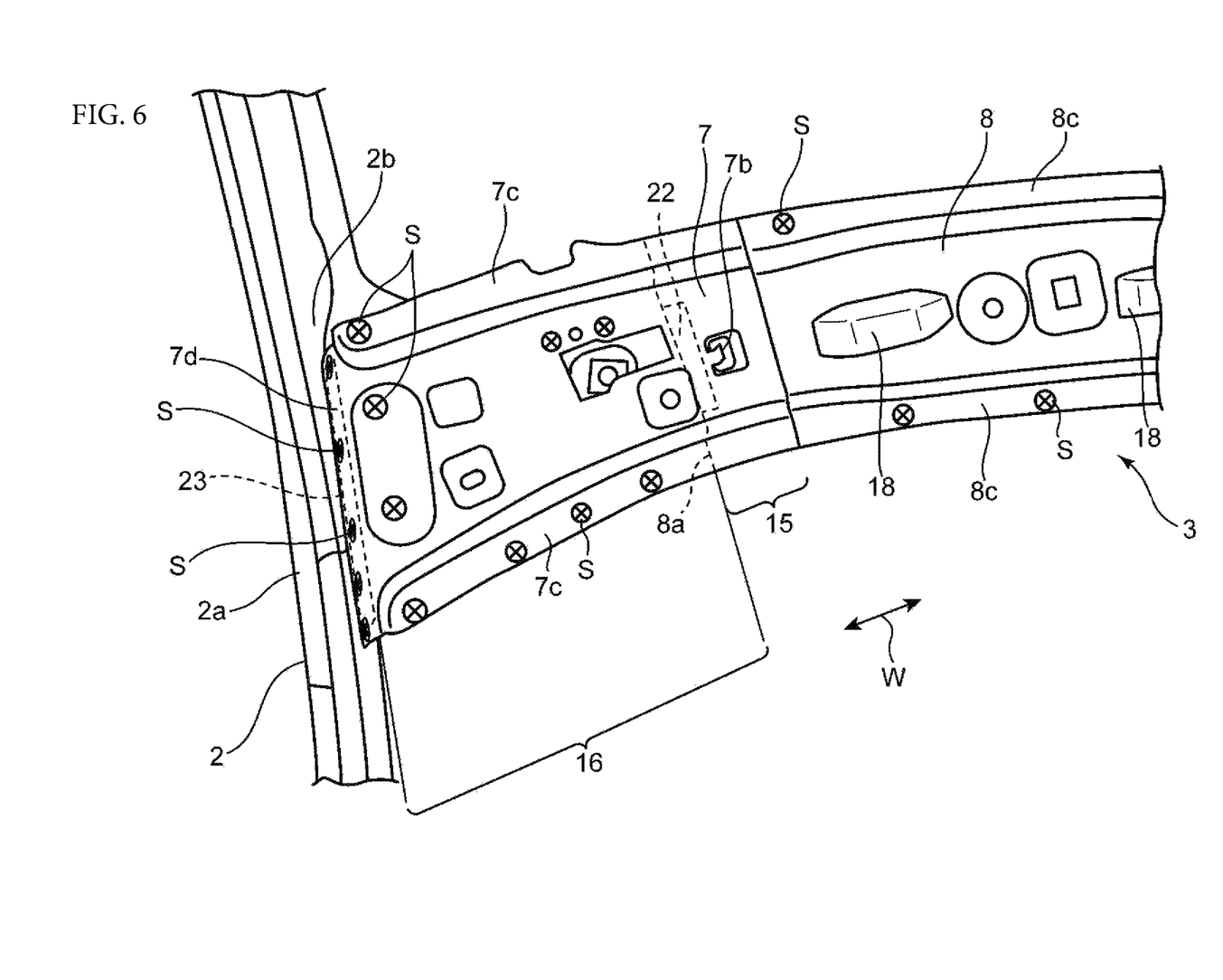
FIG. 6 is a perspective view for illustrating the arrangement of the adhesives when the front header illustrated in FIG. 2 is seen from below.

In this embodiment, as illustrated in FIG. 7, the low-rigid portion 11 of the front header 3 has a closed cross section 19 that has the longitudinal direction of the front header 3 as a normal direction. As illustrated in FIGS. 5 to 7, the closed cross section 19 is formed when the flanges 6c, 7c of the upper member 6 and the lower side member 7 constituting the front header 3 overlap each other and the flanges 6c, 7c are welded at the plural welding points S by spot welding.

Furthermore, in this embodiment, as illustrated in FIGS. 3 to 5 and FIG. 9, the low-rigid portion 11 of the upper member 6 has an opening 14 that is formed in a part of a portion constituting the closed cross section 19.

As illustrated in FIG. 2 and FIG. 8, in the upper member 6, the high-rigid portion 12 of the front header 3 has a portion formed such that the distance between the plural ridgeline portions 13 becomes a shorter second distance A2 than the first distance A1 (see FIG. 7) between the ridgeline portions 13 in the low-rigid portion 11. In addition, in this embodiment, a width B2 of each of the plural ridgeline portions 13 in the high-rigid portion 12 is greater than a width B1 (see FIG. 7) of each of the ridgeline portions 13 in the low-rigid portion 11.

The high-rigid portion 12 has plural (two in this embodiment) closed cross sections 20, each of which has the longitudinal direction as the normal direction. As illustrated in FIGS. 5 to 6 and FIG. 8, plural closed cross sections 20 are formed when the flanges 6c, 8c of the upper member 6 and the lower center member 8 constituting the front header 3 overlap each other and the flanges 6c, 8c are welded at the plural welding points S by spot welding.

A portion between the plural closed cross sections 20 in the high-rigid portion 12 is defined when a bulged portion 18, which is formed when projected upward at an intermediate position of the lower center member 8, and a bulged portion 17, which is formed when recessed downward at an intermediate position of the upper member 6, about each other. The high-rigid portion 12, which has the plural closed cross sections 20 as described above, is reinforced by the bulged portions 17, 18 forming the plural closed cross sections 20. Thus, rigidity of the high-rigid portion 12 is higher than that of the low-rigid portion 11 only having the single closed cross section 19.

In addition, in this embodiment, as illustrated in FIG. 4 and FIG. 6, an outer end 7d of each of the lower side members 7 in the width direction W of the vehicle body 1 is joined to corresponding one of the inner members 2b of the front pillars 2 via the damping glue 23. Furthermore, the lower side member 7 is joined at the plural welding points S to the inner member 2b by spot welding.

Preferably, the lower side member 7 is brought into a joined state to the front pillar 2 in advance as illustrated in FIG. 3 by the adhesion using the damping glue 23 (see FIG. 4 and FIG. 6) and spot welding, and the lower center member 8 and the upper member 6 are joined to the lower side member 7. In this case, as illustrated in FIGS. 4 to 5, in a sub-assembly state where the lower center member 8 and the upper member 6 are combined together in advance, the lower center member 8 may be joined to the lower side member 7 by the damping glue 22 and may also be welded at the welding points S to the lower side member 7 by spot welding through the opening 14 of the upper member 6. In addition, even in the case where the lower center member 8 and the upper member 6 are not brought into the sub-assembly state, the lower center member 8 may be joined to the lower side member 7, and the lower side member 8 may additionally be welded to the lower side member 7 by spot welding through the opening 14 of the upper member 6.

The lower center member 8 is a long member that extends in the width direction W of the vehicle body 1. As illustrated in FIG. 4 and FIG. 6, at a position of an overlapping portion 15 away from the portion, which is joined to the front pillar 2, in the lower side member 7 of the front header 3 (the outer end 7d in the width direction W of the lower side member 7), the lower center member 8 is joined to the lower side members 7 in a partially overlapping state.

More specifically, an end 8a of the lower center member 8 overlaps the end 7a of the lower side member 7 from above, and an engagement projection 7b near the end 7a is engaged with an engagement hole 8b near the end 8a. In this way, the overlapping portion 15 illustrated in FIG. 4 is formed. Then, at an end on the front pillar 2 side in the overlapping portion 15 with the lower center member 8 (more specifically, a portion near the end 8a of the lower center member 8), the lower side member 7 is joined to the lower center member 8 via the damping glue 22. Furthermore, in the overlapping portion 15, the lower center member 8 is welded at the plural welding points S to the lower side member 7 by spot welding. Spot welding between the lower side member 7 and the lower center member 8 is performed through the opening 14 of the upper member 6 illustrated in FIG. 5.

Figure 10:
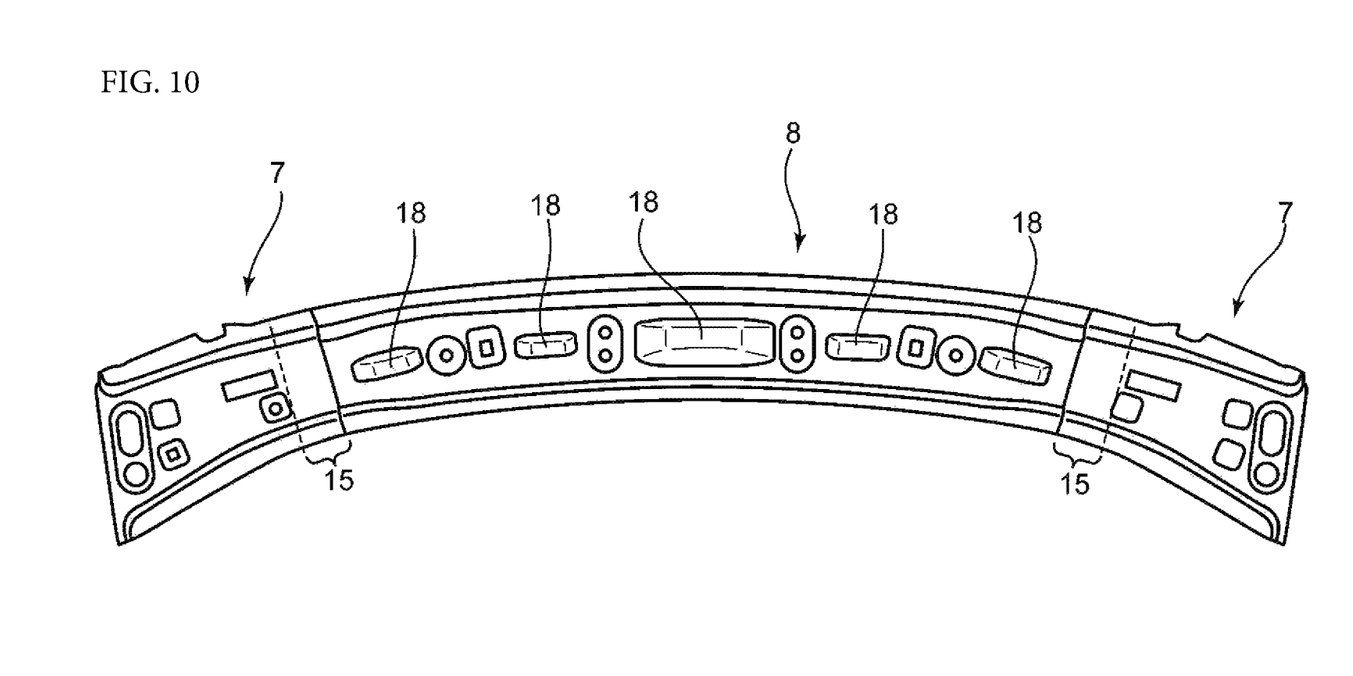
FIG. 10 is a view in which a state of combining a lower side member and a lower center member illustrated in FIG. 3 is seen from below.

In this embodiment, as illustrated in FIG. 6 and FIG. 10, at a position away from the overlapping portion 15 in each of the ends of the lower center member 8, the lower center member 8 has the bulged portion 18 as a reinforced portion, rigidity of which is partially higher than the other portions of the lower center member 8.

The bulged portion 18 is a deformed portion such that the plate-shaped structure constituting the lower center member 8 is bent in the plate thickness direction of the plate-shaped structure (in this embodiment, in an upward direction of the lower center member 8). In this embodiment, the plural bulged portions 18 are formed along the longitudinal direction of the lower center member 8. The bulged portion 18, which is formed at the intermediate position in the longitudinal direction of the lower center member 8, is formed to have the largest projection amount.

When it is considered that the damping glues 21, 22, 23 are used together with spot welding at the welding spots S as in this embodiment, an adhesive with a lower adhesive force than an adhesive used to join the windshield 5 to the edge of the window opening 4 may be adopted as each of the damping glues 21, 22, 23.

In the above embodiment, the description has been made on the structure of defining the window opening 4, to which the front-side windshield 5 can be attached, as the one example of the vehicle body upper structure according to the present disclosure. However, the present disclosure is not limited thereto. The vehicle body upper structure according to the present disclosure can also be applied to a structure of defining a window opening for a rear windshield or a window opening for a sunroof in a sedan or the like.

Characteristics of this Embodiment (1)

The upper structure of the vehicle body 1 in this embodiment includes: the pair of the front pillars 2 as the first structures; and the front header 3 as the second structure.

The front header 3 includes: the low-rigid portion 11 that is joined to the projected portion 2c of the front pillars 2; and the high-rigid portion 12 that is arranged at the position away from the portions (the ends 6a, 7d) where the low-rigid portion 11 is joined to the front pillar 2 and is more rigid than the low-rigid portion 11.

As illustrated in FIG. 4, the low-rigid portion 11 in this embodiment is joined to the front pillar 2 via the damping glues 21, 23 as the damping members (see FIGS. 3 to 6).

In such a configuration, the upper member 6 and the front header 3 including the upper member 6, which define at least the part of the window opening 4 in cooperation with the front pillars 2, include the low-rigid portions 11 (see FIGS. 2 to 6, FIG. 7, and FIG. 9), each of which is joined to the front pillars 2. Accordingly, the vibration that is transmitted from the front pillar 2 to the front header 3 is first input to the low-rigid portion 11 of the front header 3 from both of the upper member 6 and the lower side member 7 of the front header 3, and the vibration is concentrated in the low-rigid portion 11. The portion near the low-rigid portion 11 of the front header 3 in the embodiment is joined to the front pillar 2 via the damping glue 21 between the upper member 6 and the projected portion 2c of the front pillar 2 and the damping glue 23 between the lower side member 7 and the inner member 2b of the front pillar 2. Thus, the vibration that is concentrated in the low-rigid portion 11 is effectively damped by the damping glues 21, 23. Meanwhile, in the upper member 6 and the front header 3 including the upper member 6, the high-rigid portion 12 is arranged at the position away from the portion (the ends 6a, 7d) where the low-rigid portion 11 is joined to the front pillar 2. Thus, it is possible to secure the rigidity of the front header 3. As a result, it is possible to improve the effect of suppressing the transmission of the vibration to the windshield 5 by the damping glues 21, 23 as the damping members while securing the rigidity of the vehicle body 1.

(2)

In the upper structure of the vehicle body 1 in this embodiment, as illustrated in FIG. 3, FIG. 5, and FIGS. 7 to 9, the front header 3 has the plural ridgeline portions 13, each of which extends in the longitudinal direction of the front header 3, in the upper member 6. The low-rigid portion 11 has the portion formed such that the distance between the plural ridgeline portions 13 becomes the specified first distance A1. The high-rigid portion 12 has the portion formed such that the distance between the plural ridgeline portions 13 becomes the shorter second distance A2 than the first distance A1.

In this configuration, when the distance A1 between the ridgeline portions 13 illustrated in FIG. 7 is changed to the distance A2 between the ridgeline portions 13 illustrated in FIG. 8, the low-rigid portion 11 and the high-rigid portion 12 can easily be formed in the front header 3. In addition, the front header 3 can easily be designed such that the low-rigid portion 11 and the high-rigid portion 12 each have the desired rigidity.

In this embodiment, the width B2 between the plural ridgeline portions 13 in the high-rigid portion 12 is greater than the width B1 (see FIG. 7) between the ridgeline portions 13 in the low-rigid portion 11. Thus, each of the ridgeline portions 13 in the high-rigid portion 12 has the improved rigidity when compared to the ridgeline portions 13 in the low-rigid portion 11. As a result, the rigidity of the high-rigid portion 12 is further improved.

(3)

In the upper structure of the vehicle body 1 in this embodiment, the ridgeline portions 13 continue such that the first distance A1 is gradually changed to the second distance A2. Thus, it is possible to suppress a rapid change in the rigidity of the front header 3 as the second structure. For example, when seen along the longitudinal direction of the front header 3, the ridgeline portions 13 continue in the longitudinal direction such that the first distance A1 is gradually changed to the second distance A2. As a result, a portion, the rigidity of which is rapidly changed, (that is, a portion where stress is likely to be concentrated) does not exist in the front header 3. Thus, the rigidity of the entire front header 3 is improved.

(4)

In the upper structure of the vehicle body 1 in this embodiment, the front header 3 as the second structure includes the lower member (the lower side member 7 and the lower center member 8) and the upper member 6. The ridgeline portions 13 are formed in either the lower members 7, 8 or the upper member 6 (the upper member 6 in this embodiment). The lower members 7, 8 and the upper member 6 are joined to each other in the portions having the second distance A2. Thus, it is possible to further improve the rigidity of the high-rigid portion 12 in the front header 3 as the second structure.

(5)

In the upper structure of the vehicle body 1 in this embodiment, each of the ridgeline portions 13 is constructed of the projection that extends in the longitudinal direction of the front header 3. Accordingly, each of the ridgeline portions 13 can be constructed by forming the projection, which extends in the longitudinal direction of the front header 3, in the upper member 6 of the front header 3. Thus, the ridgeline portions 13 can easily be designed and processed.

(6)

In the upper structure of the vehicle body 1 in this embodiment, the front header 3 has the upper member 6 that is constructed of the plate-shaped structure extending to connect the front pillars 2. Each of the projections constituting the ridgeline portions 13 is the portion that is deformed to bend the upper member 6 in the plate thickness direction.

In this configuration, it is possible to easily form the projection constituting the ridgeline portion 13 by processing the upper member 6, which is formed of the plate-shaped structure such as the thin metal plate, by pressing or the like.

(7)

In the upper structure of the vehicle body 1 in this embodiment, the high-rigid portion 12 has the bulged portion 17 that is formed when the upper member 6 formed of the plate-shaped structure is recessed downward. Accordingly, it is possible to improve the rigidity while suppressing the upward projection of the high-rigid portion 12 and the front header 3 (particularly, the upper member 6) including the high-rigid portion 12.

(8)

In the upper structure of the vehicle body 1 in this embodiment, the low-rigid portion 11 illustrated in FIG. 7 has the closed cross section 19 that has the longitudinal direction of the front header 3 as the normal direction. The high-rigid portion 12 illustrated in FIG. 8 has the plural (two) closed cross sections 20, each of which has the longitudinal direction as the normal direction.

In this configuration, the low-rigid portion 11 and the high-rigid portion 12 can be constructed by changing the number of the closed cross sections 19, 20. Thus, it is unnecessary to significantly change outer dimensions of each of the closed cross sections 19, 20 in the low-rigid portion and the high-rigid portion 12. As a result, it is possible to reduce an influence on shapes and arrangement of components (a roof panel and the like) of the vehicle body 1 that are arranged around the front header 3.

Note that, although the high-rigid portion 12 illustrated in FIG. 8 has the two closed cross sections 20, the present disclosure is not limited thereto, and the high-rigid portion 12 may have the three or more closed cross sections.

(9)

In the upper structure of the vehicle body 1 in this embodiment, the low-rigid portion 11 illustrated in FIGS. 3 to 5 and FIG. 9 has the opening 14 that is formed in the part of the portion constituting the closed cross section 19. When the opening 14 is formed in the part of the closed cross section 19 in the low-rigid portion 11, just as described, it is possible to further reduce the rigidity of the low-rigid portion 11. In this way, the vibration can further be concentrated in the low-rigid portion 11, and it is possible to further improve the effect of suppressing the transmission of the vibration to the windshield 5 by the damping glues 21, 23 (particularly, the damping glue 21 on the upper member 6 side).

(10)

The upper structure of the vehicle body 1 in this embodiment includes: the pair of the front pillars 2 as the first structures; the front header 3 as the second structure; and the damping glue 22 (see FIGS. 3 to 6) that joins the lower side members 7 (the first components) and the lower center member 8 (the second component) as the components of the front header 3.

As illustrated in FIGS. 3 to 4 and FIG. 6, each of the lower side members 7 is joined to the respective front pillars 2. The lower center member 8 extends in the width direction W of the vehicle body 1, and, at the position away from the portion (the outer end 7*d* in the width direction W of the lower side member 7), which is joined to the front pillar 2, is joined to the lower side members 7 in the partially overlapping state. At the end on the front pillar 2 side in the overlapping portion 15 with the lower center member 8 (in this embodiment, in the portion near the end 8*a* of the lower center member 8), the lower side member 7 is joined to the lower center member 8 via the damping glue 22.

In this configuration, the front header 3, which defines the window opening 4 in cooperation with the pair of the front pillars 2, includes: the pair of the lower side members 7 joined to the pair of the front pillars 2; and the lower center member 8. In each of the lower side members 7, the rigidity is partially increased in the overlapping portion 15 in which the lower side member 7 overlaps and is joined to the lower center member 8. Meanwhile, in a portion 16 (see FIG. 4 and FIG. 6) where the lower side member 7 does not overlap the lower center member 8, the rigidity is relatively lower than that of the overlapping portion 15.

Accordingly, as described above, at the end on the front pillar 2 side in the overlapping portion 15 with the lower center member 8 (in the portion near the end 8*a* of the lower center member 8), the lower side member 7 is joined to the lower center member 8 via the damping glue 22. In this way, the portion 16, which does not overlap the lower center member 8, in the lower side member 7 can also be joined to the lower center member 8 via the damping glue 22 within a range of the overlapping portion 15.

In such a configuration, the vibration that is transmitted from the front pillar 2 to the front header 3 is first concentrated in the low-rigid portion 16 (see FIG. 4 and FIG. 6), which does not overlap the lower center member 8, in the lower side member 7 of the front header 3. This low-rigid portion 16 is joined to the lower center member 8 by the damping glue 22 as described above. Thus, the vibration that is concentrated in this low-rigid portion 16 is effectively damped by the damping glue 22. Meanwhile, the rigidity of the front header 3 can be secured by the high-rigid overlapping portion 15 where the lower side member 7 overlaps and is joined to the lower center member 8. As a result, it is possible to improve the effect of suppressing the transmission of the vibration to the windshield 5 by the damping glue 22 while securing the rigidity of the vehicle body 1.

(11)

In the upper structure of the vehicle body 1 in this embodiment, the outer end 7d in the width direction W of the lower side member 7 is joined to the front pillar 2 by the damping glue 23.

In this configuration, the low-rigid portion 16, which does not overlap the lower center member 8, in the lower side member 7 is joined to the front pillar 2 and the lower center member 8 by the damping glues 22, 23, respectively. Thus, it is possible to further effectively damp the vibrations concentrated in this portion by the damping glues 22, 23 at the two positions.

(12)

In the upper structure of the vehicle body 1 in this embodiment, as illustrated in FIG. 6 and FIG. 10, at the position away from the overlapping portion 15, the lower center member 8 has the bulged portion 18 as the reinforced portion, the rigidity of which is partially higher than the other portions of the lower center member 8.

In this configuration, in the lower center member 8, the bulged portion 18 as the reinforced portion having the high rigidity is provided at the position away from the joined portion (the overlapping portion 15) to the lower side member 7. Thus, it is possible to improve the rigidity of not only the lower center member 8 but also the entire front header 3 including the lower center member 8.

(13)

In the upper structure of the vehicle body 1 in this embodiment, the lower center member 8 is constructed of the plate-shaped structure. The bulged portion 18 as the reinforced portion is the portion that is deformed to bend the plate-shaped structure in the plate thickness direction of the plate-shaped structure. In this configuration, it is possible to easily form the bulged portion 18 as the reinforced portion in the lower center member 8 by processing the plate-shaped structure by pressing or the like.

DESCRIPTION OF REFERENCE SIGNS AND NUMERALS

1: Vehicle body
2: Front pillar (first structure)
3: Front header (second structure)
4: Window opening
5: Windshield
6: Upper member
7: Lower side member (first component)
8: Lower center member (second component)
11: Low-rigid portion
12: High-rigid portion
13: Ridgeline portion
14: Opening
15: Overlapping portion
16: Non-overlapping portion
17, 18: Bulged portion
19, 20: Closed cross section
21, 22, 23: Damping glue

The invention claimed is:

1. A vehicle body upper structure comprising:
a damping material;
a pair of first structures that constitutes portions on both sides in a width direction of a vehicle body in an upper portion of the vehicle body; and
a second structure that extends in the width direction and is joined at opposing ends to the first structures so as to define at least a part of a window opening, to which a windshield is attachable in cooperation with the pair of first structures, wherein
the second structure includes
a low-rigid portion that is joined to one of the pair of first structures in a first area of the one of the pair of first structures, and
a high-rigid portion that is separated in distance in the width direction from the first area and that has higher rigidity than the low-rigid portion,
the low-rigid portion is joined to the one of the pair of first structures via the damping material,
the second structure includes a lower member and an upper member,
the lower member of the second structure includes
a pair of lower side members that constitutes portions on both sides of a lower surface of the second structure, and
a lower center member that constitutes a lower central portion of the second structure,
the upper member of the second structure includes the low-rigid portion and the high-rigid portion
an end of the upper member in the low-rigid portion is directly joined to the first structure via the damping material,
an outer end of each of the pair of lower side members in the width direction of the vehicle body is directly joined to the first structure via the damping material, and
each of the pair of lower side member is directly joined to the lower center member via the damping material.

2. The vehicle body upper structure according to claim 1, wherein
the second structure has plural ridgeline portions, each of which extends in a longitudinal direction of the second structure,
the low-rigid portion has a portion formed such that a distance between the plural ridgeline portions is a specified first distance, and
the high-rigid portion has a portion formed such that a corresponding distance between plural ridgeline portions in the high-ridge portion is a second distance that is shorter than the specified first distance.

3. The vehicle body upper structure according to claim 2, wherein
as respective locations along the low-ridge portion become progressively more distant from the one of the pair of first structures, a length of the specified first distance gradually approaches a length of the second distance.

4. The vehicle body upper structure according to claim 3, wherein
the ridgeline portions are formed in the lower member or the upper member, and
the lower member and the upper member are joined to each other in a portion having the second distance.

5. The vehicle body upper structure according to claim 4, wherein
the ridgeline portions comprise projections, each of which extends in the longitudinal direction of the second structure,
the second structure includes a plate-shaped structure that extends to connect the pair of first structures, and
each of the projections includes a portion of the plate-shaped structure that is deformed in a plate-thickness direction of said plate-shaped structure.

6. The vehicle body upper structure according to claim 3, wherein
the ridgeline portions comprise projections, each of which extends in the longitudinal direction of the second structure.

7. The vehicle body upper structure according to claim 6, wherein
the second structure includes a plate-shaped structure that extends to connect the pair of first structures, and
each of the projections includes a portion of the plate-shaped structure that is deformed in a plate-thickness direction of said plate-shaped structure.

8. The vehicle body upper structure according to claim 1, wherein
the high-rigid portion includes a bulged portion that is formed as a downward formation in the plate-shaped structure.

9. The vehicle body upper structure according to claim 3, wherein
the low-rigid portion has a closed cross section that has the width direction of the vehicle body as a normal direction, and
the high-rigid portion has plural closed cross sections, each of which has the width direction of the vehicle body as a normal direction.

10. The vehicle body upper structure according to claim 9, wherein
the low-rigid portion has an opening that is formed in a part of a portion constituting the closed cross section.

11. The vehicle body upper structure according to claim 2, wherein
the ridgeline portions are formed in the lower member or the upper member, and
the lower member and the upper member are joined to each other in a portion having the second distance.

12. The vehicle body upper structure according to claim 11, wherein
the ridgeline portions comprise projections, each of which extends in the longitudinal direction of the second structure.

13. The vehicle body upper structure according to claim 12, wherein
the second structure includes a plate-shaped structure that extends to connect the pair of first structures, and
each of the projections includes a portion of the plate-shaped structure that is deformed in a plate-thickness direction of said plate-shaped structure.

14. The vehicle body upper structure according to claim 13, wherein
the high-rigid portion includes a bulged portion that is formed as a downward formation in the plate-shaped structure.

15. The vehicle body upper structure according to claim 2, wherein
the ridgeline portions comprise projections, each of which extends in the longitudinal direction of the second structure.

16. The vehicle body upper structure according to claim 15, wherein
the second structure includes a plate-shaped structure that extends to connect the pair of first structures, and
each of the projections includes a portion of the plate-shaped structure that is deformed in a plate-thickness direction of said plate-shaped structure.

17. The vehicle body upper structure according to claim 16, wherein
the high-rigid portion includes a bulged portion that is formed as a downward formation in the plate-shaped structure.

18. The vehicle body upper structure according to claim 1, wherein
the low-rigid portion has a closed cross section that has the width direction of the vehicle body as a normal direction, and
the high-rigid portion has plural closed cross sections, each of which has the width direction of the vehicle body as a normal direction.

19. The vehicle body upper structure according to claim 1, wherein
the pair of first structures is a pair of front pillars of a vehicle, and
the second structure is a front header of the vehicle.

* * * * *